March 7, 1967   R. H. DOBBS   3,307,415
REVERSIBLE DRIVE UNIT
Filed Feb. 17, 1965
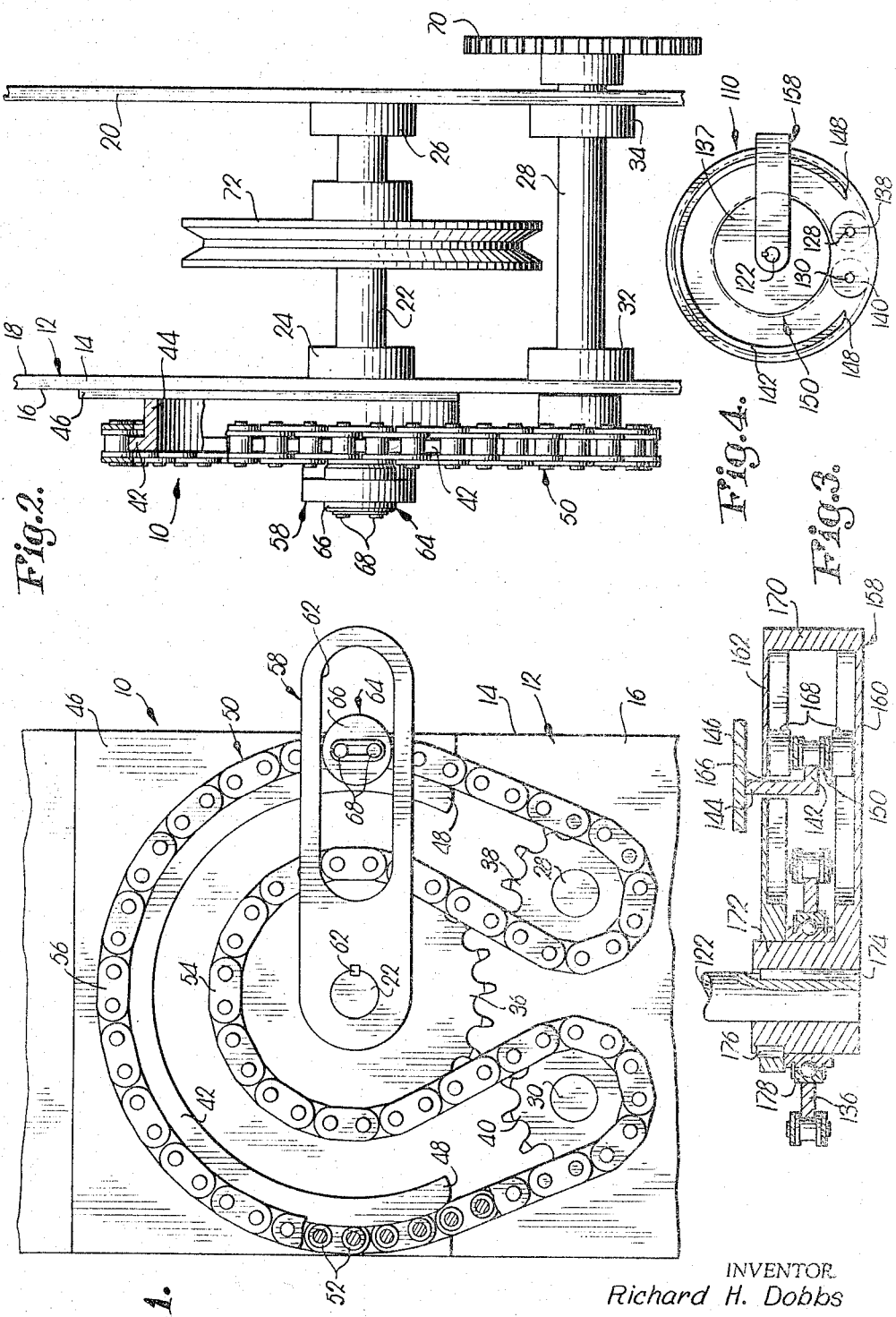
INVENTOR.
Richard H. Dobbs United States Patent Office 3,307,415
Patented Mar. 7, 1967

3,307,415
REVERSIBLE DRIVE UNIT
Richard H. Dobbs, Winfield, Kans., assignor to
Harriette E. Dobbs, Winfield, Kans.
Filed Feb. 17, 1965, Ser. No. 433,415
20 Claims. (Cl. 74—37)

This invention relates to improvements in reversing mechanisms and has as its primary object the provision of a reversible drive unit which utilizes an endless, flexible drive member mounted to move one stretch of the member in one direction and another stretch of the same in the opposite direction whereby a rotatably mounted driven element on one side of the drive member, and interconnected with the latter at a specific location thereon, will be driven in opposed directions by the drive member to thereby reverse any and all structures coupled to the element itself.

Another object of this invention is the provision of a drive unit of the aforesaid character which may be constructed to permit control of the speeds of movement of the driven element as well as the time required for reversing the movement thereof, whereby the drive unit may be utilized with different types of reversing structures requiring special operating characteristics.

Still a further object of this invention is the provision of a reversible drive unit of the type described which is relatively simple in construction, may be assembled with commercially available components and requires a minimum of maintenance whereby to minimize the cost of production and operation of the unit itself.

In the drawing:

FIGURE 1 is a front elevational view of one embodiment of the drive unit;

FIG. 2 is a side elevational view thereof;

FIG. 3 is a fragmentary, cross-sectional view of a portion of a reversible drive unit forming another embodiment of the instant invention; and FIG. 4 is a front elevational view on a reduced scale of the reversible drive unit with which the structure of FIG. 3 is associated.

Reversible drive unit 10 includes a support 12 in the nature of a flat plate 14 having a pair of opposed faces 16 and 18. For purposes of illustration only, plate 14 is shown as being mounted in an upright position and spaced from a second plate 20 with a first shaft 22 spanning the distance between and rotatably mounted on plates 14 and 20 by bearings 24 and 26 respectively. A pair of spaced second shafts or shaft elements 28 and 30 also span the distance between plates 14 and 20 and are parallel with shaft 22, each of the second shafts having bearings 32 and 34 for journaling the same on plates 14 and 20 respectively. Shafts 22, 28 and 30 project outwardly from face 16 of plate 14 as shown in FIG. 2.

A toothed component or sprocket 36 is rotatably mounted on the outer end of shaft 22 and is generally parallel with face 16. Sprockets 38 and 40 are secured to the outer ends of shafts 28 and 30 respectively for rotation therewith, sprockets 38 and 40 being of a smaller diameter than that of sprocket 36 as shown in FIG. 1. Sprockets 38 and 40 are spaced from sprocket 36 and are disposed on one side of the latter. For purposes of illustration only, sprockets 38 and 40 are disposed below sprocket 36 and to one side of an imaginary vertical line passing through the axis of rotation of sprocket 36, it being understood that sprocket 36 is substantially concentric to shaft 22.

An arcuate rib 42 partially surrounds sprocket 36 and is substantially coplanar therewith as shown in FIG. 2. Rib 42 is mounted in spaced relationship to face 16 by an arcuate extension 44 projecting outwardly from a plate-like base 46 rigid in any suitable manner to face 16 of plate 14. Rib 42 extends outwardly from extension 44 in a direction away from sprocket 36. The ends 48 of rib 42 are spaced outwardly from sprocket 36 and upwardly from and to the side of respective sprockets 38 and 40. Ends 48 lie along an imaginary line passing between the major portion of sprocket 36 and shafts 28 and 30.

An endless, flexible drive member 50 in the nature of a link chain is coupled with sprockets 36, 38 and 40 and rib 42 for movement relative to support 12. Member 50 is in mesh with sprockets 36, 38 and 40 and moves with these sprockets as the latter rotate about their respective central axes. Member 50 is provided with antifriction means 52 in the nature of rollers or the like between the links thereof, means 52 being in rolling engagement with the outer periphery of rib 42 for movement along the same. Thus, sprockets 36, 38 and 40 and rib 42 define structures for mounting drive member 50 on support 12 with one stretch 54 of member 50 on sprocket 36 being movable in one direction, while another stretch 56 of drive member 50 on rib 42 moves in the opposite direction. Sprockets 38 and 40 permit reversal of the movement of member 50 as the same extends between sprocket 36 and rib 42. As shown in FIG. 1, the links of the chain defining drive member 50 overlap a portion of rib 42 when means 52 engage the periphery thereof, whereby stretch 56 of drive member 50 is retained on rib 42 and thus remains concentric with stretch 54, it being clear that rib 42 is substantially concentric with shaft 22 and sprocket 36.

A lever 58 is secured to the outer end of shaft 22 by means of a key 60 for rotation therewith. Lever 58 extends laterally from shaft 22 and effectively spans the distance between the latter and rib 42 as is shown in FIG. 1. Lever 58 is provided with a longitudinally extending slot 62 which defines a recess therein for receiving a follower 64 secured to member 50 for movement therewith. Follower 64 includes a disc 66 secured by pins 68 to member 50, disc 66 projecting laterally from member 50 as shown in FIG. 2. Thus, movement of drive member 50 causes follower 64 to rotate lever 58 and thereby shaft 22 relative to support 12.

Shaft 28 is provided with a sprocket 70 adjacent the end thereof opposed to the end coupled to sprocket 38 as shown in FIG. 2. Sprocket 70 is adapted to be rotated in one direction by a suitable power source, such as a motor or the like. Shaft 28 thus rotates under the influence of sprocket 70 and, in turn, causes drive member 50 to move in a specific direction. For purposes of illustration only, a sheave 72 is rigid to shaft 22 between plates 14 and 20. Sheave 72 forms a part of the apparatus to be reversed in operation.

In operation, unit 10 is preferably disposed in the disposition thereof shown in FIGS. 1 and 2. Sprocket 70 is operably coupled with a suitable power source and caused to rotate in one direction to in turn, rotate shaft 28 therewith. As shaft 28 rotates, drive member 50 is moved in a corresponding direction so that stretch 56 moves in one direction and shaft 54 moves in the opposite direction.

If shaft 28 is rotated in a clockwise sense, when viewing FIG. 1, stretch 54 will move in a counterclockwise sense and stretch 56 will move in a clockwise sense. Thus, lever 58 will rotate in a clockwise sense when follower 64 moves along rib 42 and will move in a counterclockwise sense when follower 64 is adjacent to and moves with sprocket 36. As follower 64 moves downwardly and beneath shaft 28, lever 58 will approach one extremity of its path of travel.

As follower 64 commences to move upwardly toward sprocket 36, lever 58 will be brought to a halt and will remain substantially at rest for a predetermined interval of time determined by the size of sprocket 38 and the speed of rotation of shaft 28. Lever 58 remains substantially motionless because slot 62 is substantially parallel with a portion of the path of follower 64 as the same moves upwardly from beneath shaft 28. However, as the path of follower 64 becomes arcuate once again in following the contour of sprocket 38, lever 58 will commence to move in a counterclockwise sense and will thereafter be continuously movable with follower 64 until the latter commences to move downwardly to a point beneath shaft 30.

After the portion of member 50 carrying follower 64 has moved into meshing relationship with sprocket 40, a location will be reached at which the path of follower 64 is substantially parallel with slot 62 once again. When this occurs, lever 58 is again brought to rest inasmuch as, for a predetermined interval of time, depending upon the size of sprocket 40 and the speed of rotation of shaft 30, follower 64 will be moving substantially parallel with lever 58. This will determine the opposite extremity of the path of travel of lever 58 and further downward movement of follower 64 beneath shaft 30 will cause lever 58 to reverse its direction of movement and to rotate in a clockwise sense once again. Follower 64 is free to move longitudinally of lever 58 within slot 62 as lever 58 reverses in direction.

The time at which lever 58 is at rest at either extremity of its path of travel can be increased or decreased by the selection of the proper sizes of sprockets 38 and 40, as well as by controlling the speed of rotation of sprocket 70. Moreover, sprockets 38 and 40 may be spaced closer together than is illustrated so that the arc through which lever 58 rotates will approach 360°. As lever 58 rotates in opposed directions, sheave 72 is also rotated therewith. Thus, movement is imparted to the apparatus to which sheave 72 is coupled so that the apparatus is periodically reversed in response to the reversal of lever 58 on support 12.

Plates 14 and 20 need not be mounted in upright positions. These components may be inclined or horizontal as desired. In addition, rib 42 may be spaced laterally from sprocket 36 and the distance therebetween may be selected so as to permit variations in the moment applied to shaft 22.

A second embodiment of the reversible drive unit is shown in FIGS. 3 and 4 and is denoted by the numeral 110. Unit 110 is substantially similar in all respects with unit 10 except that unit 110 is provided with a disc 136 instead of a sprocket such as sprocket 36 and includes a lever 158 of different construction from lever 58. The essential operation of unit 110 is substantially the same as that of unit 10; accordingly, the means for operating unit 110 and the structure to be driven thereby is not illustrated.

Disc 136 has a continuous outer periphery 137 which is engaged by an endless, flexible drive member 150 such as a link chain or the like. Disc 136 is rotatably mounted on a shaft 122 to which apparatus to be reversed is coupled. An arcuate rib 142 is concentric with shaft 122 and disc 136 and has ends 148 lying along a line passing through components 138 and 140 secured to respective shafts 128 and 130. Member 150 passes about components 138 and 140 and extends along rib 142 and is movable relative to the latter under the influence of one of the components 138. Preferably, components 138 and 140 are sprockets similar to sprockets 38 and 40, but it is conceivable that components 138 and 140 may be of other construction. In this respect, drive member 150 may be an endless, flexible belt, and components 138 and 140 may be pulleys. Disc 136 would also be replaced by a pulley and the belt would slide along rib 142 and be held thereon by suitable structure as desired.

Lever 158 includes a pair of arms 160 and 162, each provided with a longitudinally extending groove 164 therein defining a recess therefor. As shown in FIG. 3, arm 162 is provided with an arcuate opening 166 therethrough for clearing extension 144 mounting rib 142 on a base plate 146. As illustrated in FIG. 3, drive member 150 includes an endless, flexible link chain having a pair of rollers 168 on opposed sides thereof, rollers 168 defining a follower movable with member 150 relative to base plate 146. Rollers 168 are received within grooves 164 and are disposed in rolling engagement with arms 160 and 162 to minimize the friction between lever 158 as the latter is moved under the influence of the driving means therefor.

Arm 160 has an outer coupling element 170 securing the same to the outermost portion of arm 162, the latter being separated into two parts to define opening 166. Arm 160 is provided with a hub 172 which is secured by a key 174 to shaft 122. The other portion of arm 162 is secured to hub 172 by means of a key 176; thus, arms 160 and 162 rotate together as a unit. Disc 136 is mounted on hub 172 for rotation with respect thereto by means of a bearing 178.

In operation, lever 158 moves in opposed directions under the influence of rollers 168 as the latter are shifted with drive member 150. Motion is imparted to drive member 150 by rotating shaft 128 which, in turn, causes component 138 to move drive member 150 in the corresponding direction.

The extremities of the path of travel of lever 158 are reached when the latter is brought to rest. This occurs when rollers 168 move substantially parallel with grooves 164. It is to be noted that rollers 168 move continuously at all times for continuous rotation of shaft 128. Thus, the time for reversal of lever 158 at each extremity of its path is constant for a given speed of rotation of shaft 128.

Components 138 and 140 are close enough together so that lever 158 moves substantially in an arc of 360°. The sizes of components 138 and 140 may be selected to provide the desired times of reversal for lever 158. The spacing between disc 136 and rib 142 is selected so that the maximum moment imparted to shaft 122 will at least equal a predetermined value.

Having thus described the invention, what is claimed as new and desired to be secured by Letters Patent is:

1. A reversible drive unit comprising:
   a support;
   a movable, endless, flexible drive member;
   a pair of spaced, structures mounted on said support, each structure having means defining a portion of the path of movement of said drive member, the portion corresponding to one of said structures being in partially surrounding relationship to the portion corresponding to the other structure, said drive member being coupled to and extending between said structures for movement relative to said support;
   means coupled with said drive member for moving the same relative to said support;
   a shaft rotatably mounted on said support; and
   means coupling said shaft with said drive member at a predetermined location on the latter, whereby the shaft rotates in one direction when said location moves along one of said portions of the path and rotates in the opposite direction when said location moves along the other of said portions of the path.

2. A reversible drive unit as set forth in claim 1, wherein is provided means between said structures for reversing the path of travel of the drive member as the latter extends between said structures.

3. A reversible drive unit as set forth in claim 2, wherein said reversing means includes a pair of shaft elements rotatably mounted on said support, and means coupling the drive member to each shaft element respectively.

4. A reversible drive unit as set forth in claim 3, wherein is provided mechanism coupled to one of said shaft elements for rotating the same relative to said support, said mechanism and said one shaft element defining said moving means.

5. A reversible drive unit as set forth in claim 1, wherein said moving means includes a shaft element rotatably mounted on said support, means coupled with said shaft element for rotating the same in one direction, and means interconnecting said shaft element and said drive member for moving the latter in response to the rotation of said shaft element.

6. A reversible drive unit as set forth in claim 1, wherein said one structure is provided with a rib defining the corresponding portion of said path, said drive member being in engagement with and movable along said rib.

7. A reversible drive unit as set forth in claim 6, wherein said drive member is provided with antifriction means engageable with said rib and the other structure for facilitating the movement of said drive member along its path of movement.

8. A reversible drive unit as set forth in claim 1, wherein the major portion of said one structure is on one side of said other structure, and wherein is provided means shiftably mounted on said support on the opposite side of said other structure and coupled with said drive member for reversing the path of movement of the drive member as the latter extends between said structures.

9. A reversible drive unit as set forth in claim 8, wherein said one structure is provided with a pair of opposed ends disposed on a line passing substantially through said reversing means.

10. A reversible drive unit as set forth in claim 8, wherein said one structure is provided with a pair of opposed ends disposed on a line passing between the major portion of said other structure and the major portion of said reversing means.

11. A reversible drive unit as set forth in claim 1, wherein said coupling means includes a lever secured to and extending outwardly from said shaft, the latter extending through and being rotatable relative to said other structure, said lever having a longitudinally extending recess therein, and a follower secured to said drive member for movement therewith, said follower being received within said recess and disposed for moving said lever and thereby rotating said shaft in response to the movement of said drive member.

12. A reversible drive unit as set forth in claim 11, wherein said lever is provided with a slot therethrough defining said recess, said follower extending laterally from one side of said drive member and being disposed within said slot.

13. A reversible drive unit as set forth in claim 11, wherein said lever is provided with a pair of opposed arms each having a groove therein, the grooves of said arms defining said recess, said follower including a pair of rollers mounted on said drive member at opposed sides of the latter, said rollers being disposed within respective grooves of said arms, the latter being on opposed sides of said other structure, one of said arms having means for clearing said one structure as the lever rotates.

14. A reversible drive unit as set forth in claim 1, wherein said other structure comprises a sprocket rotatably mounted on said shaft, said drive member including a chain in mesh with said sprocket.

15. A reversible drive unit as set forth in claim 1, wherein said other structure comprises a disc having a continuous periphery and rotatably mounted on said shaft, said drive member including a chain having antifriction means engageable with the major portion of the periphery of said disc.

16. A reversible drive unit as set forth in claim 1, wherein said other structure includes a circular component, said shaft extending through and being rotatable relative to said component, said one structure including an arcuate rib, said component and said rib being substantially concentric to said shaft.

17. A reversible drive unit comprising:
a support;
an endless, flexible drive member;
means mounting the drive member on said support for movement relative thereto with one stretch of the drive member moving in one direction and another stretch of the drive member moving in the opposite direction;
means coupled with said drive member for moving the same relative to the support;
a shaft rotatably mounted on the support and spaced from said drive member, said one stretch being between said shaft and the other stretch; and
means interconnecting said shaft and said drive member at a predetermined location on the latter.

18. A reversible drive unit as set forth in claim 17, wherein said stretches are disposed in at least partially surrounding relationship to said shaft.

19. A reversible drive unit comprising:
a support;
a first shaft rotatably mounted on said support;
a first sprocket rotatably mounted on said first shaft;
an arcuate rib spaced from and partially surrounding the first sprocket, said rib being substantially coplanar with said first sprocket;
means mounting said rib on said support;
a pair of spaced second shafts rotatably mounted on said support and being spaced from said sprocket and said rib;
a second sprocket for each second shaft respectively, the second sprockets being secured to respective second shafts for rotation therewith, said second sprockets being adjacent to corresponding ends of said rib and spaced outwardly from the side of said first sprocket opposite to the side thereof adjacent to the major portion of said rib, said ends of the rib lying on a line disposed between said second shafts and the major portion of said first sprocket;
an endless, flexible chain in meshing relationship with said sprockets and engaging said rib for movement with the sprockets relative to said support, said chain having antifriction means thereon for facilitating the movement thereof along said rib;
means coupled with one of the second shafts for rotating the same, whereby the stretch of the chain on said first sprocket is moved in one direction and the stretch of the chain on said rib is moved in the opposite direction;
a follower secured to said chain and extending outwardly therefrom; and
a lever secured to said first shaft for rotation therewith and extending outwardly therefrom, said lever spanning the distance between said shaft and said rib and provided with a longitudinally extending recess therein, said follower being received within said recess and disposed for moving said lever and thereby rotating said first shaft as said chain moves in response to the rotation of said one second shaft.

20. A reversible drive unit comprising:
a support;
a first shaft rotatably mounted on said support;
a disc rotatably mounted on said first shaft;
an arcuate rib spaced from and surrounding the major portion of said disc, said rib being substantially concentric with said first shaft and said disc;
means mounting said rib on said support;
a pair of spaced second shafts rotatably mounted on said support and being spaced from said disc and said rib;
a sprocket for each second shaft respectively, the sprockets being secured to respective second shafts for rotation therewith, said sprockets being coplanar with said disc and said rib, said sprockets being adjacent to corresponding ends of said rib and spaced outwardly from said disc, the ends of said rib lying along a line in relatively close proximity to said second shafts;

an endless, flexible chain in meshing relationship with said sprockets and engaging the peripheries of said disc and said rib for movement with the sprockets relative to the support, said chain having antifriction means thereon for facilitating the movement thereof along said disc and said rib;

means coupled with one of the second shafts for rotating the same, whereby the stretch of the chain on said disc is moved in one direction and the stretch of the chain on said rib is moved in the opposite direction;

a follower secured to said chain for movement therewith, said follower having a pair of rollers on opposed sides of said chain; and a lever coupling the first shaft with said follower for rotating the first shaft in response to the movement of said chain, said lever including a pair of arms on opposed sides of said chain and said groove and being secured to said first shaft, each arm having a longitudinally extending groove, said rollers being received with respective grooves of said arms and in rolling engagement with the latter, one of said arms having an opening therethrough for clearing said rib as the lever rotates with said first shaft under the influence of said chain.

References Cited by the Examiner
UNITED STATES PATENTS 3,127,777    4/1964    Pietsch _____ 74—37 X MILTON KAUFMAN, *Primary Examiner.*